United States Patent [19]
Inoue

[11] Patent Number: 5,451,073
[45] Date of Patent: Sep. 19, 1995

[54] AUTOMOBILE SUSPENSION

[76] Inventor: Fujio Inoue, 1428, Sakawa, Odawara-shi, Kanagawa-ken, Japan

[21] Appl. No.: 84,554

[22] Filed: Jun. 29, 1993

[30] Foreign Application Priority Data

Jun. 29, 1992 [JP] Japan .................. 4-210626

[51] Int. Cl.6 ............................. B60G 3/20
[52] U.S. Cl. .................. 280/675; 280/691; 280/693
[58] Field of Search ........... 280/690, 691, 675, 673, 280/692, 693

[56] References Cited

U.S. PATENT DOCUMENTS 5,286,052 2/1994 Lukianov .................. 280/691

FOREIGN PATENT DOCUMENTS 56216 3/1989 Japan .................. 280/673

Primary Examiner—Karin L. Tyson
Attorney, Agent, or Firm—Woodcock Washburn Kurtz Mackiewicz & Norris

[57] ABSTRACT

An automobile suspension, either of strut or double wishbone type, which can solve the problems in the prior art suspension including trends of vertical tire stroke shortage and limitations imposed on the whirling and straight running performance due to space restrictions, because the geometry in the up-and-down movement of the wheel carrier determined by the length, mounting position, mounting angle, etc. of upper and lower arms in the suspension.

To this end, in the strut type suspension two different positions on an automobile body side lower arm are selected as a coupling point for a wheel carrier side lower arm and a pull rod to improve the degree of freedom of the suspension geometry design.

8 Claims, 7 Drawing Sheets

AUTOMOBILE SUSPENSION

BACKGROUND OF THE INVENTION

1. Field of the Invention

This invention relates to automobile suspensions.

2. Brief Description of the Prior Art

Figure 1:
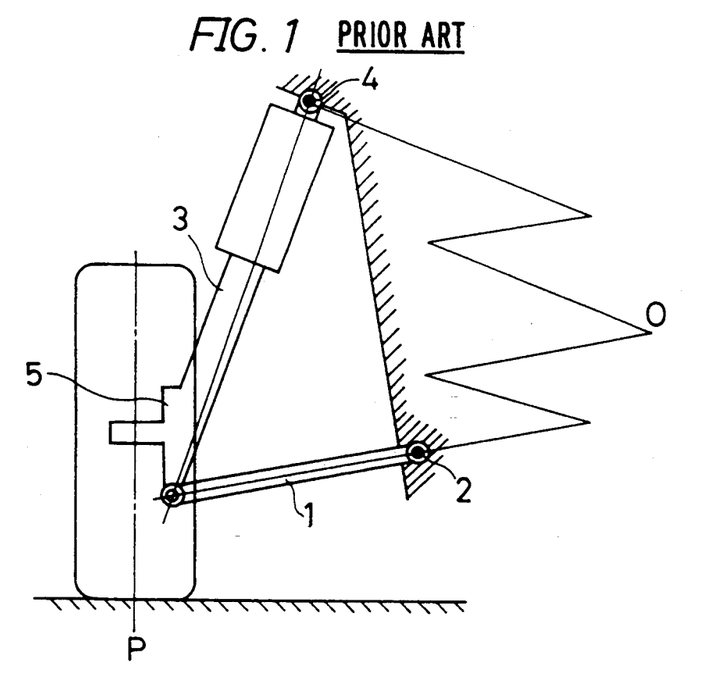
FIG. 1 is a structural representation of a prior art suspension of strut type.
Figure 2:
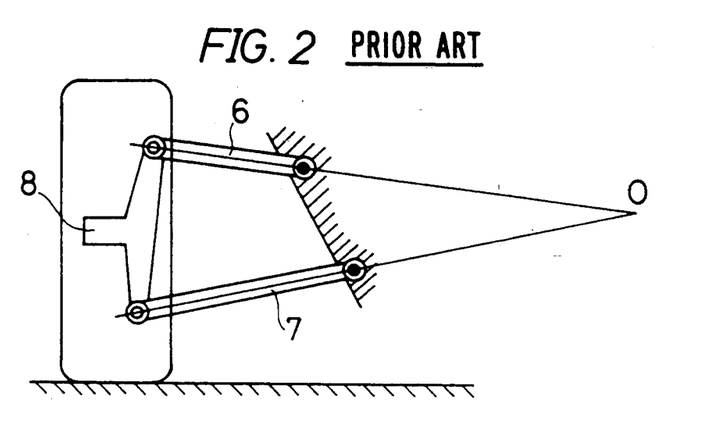
FIG. 2 is a structural representation of a prior art suspension of double wishbone type.

A prior art suspension of strut type as shown in FIG. 1, has a lower arm 1 having an inner end 2 fulcrumed to the vehicle body and a strut unit 3 having a piston rod upper end 4 also coupled to the vehicle body. The lower end of the strut is rigidly coupled to a wheel carrier 5, which is in turn coupled to the outer end of the lower arm 1. Vertical motion of the strut 3, which is restricted by an arcuate motion of the lower arm 1 ABOUT the the automobile body side coupling points 2 and 4, is coupled to the wheel carrier 5 to cause a fixed vertical motion thereof. In a prior art suspension of double wishbone type as shown in FIG. 2, an upper and a lower arm 6, 7 have their inner ends both coupled to the automobile body and their outer ends both coupled to wheel carrier 8, these arms undergoing arcuate motions about their automobile body side coupling points as support points cause a fixed vertical motion of the wheel carrier 8.

In the prior art suspensions, the geometry in the vertical motion of the wheel carrier is determined by the length, mounting position, mounting angle, etc. of the upper and lower arms having predetermined lengths, with respect to the automobile body side coupling points of these arms as support points.

Thus, in the suspension, usually of the strut type, the wheel carrier 5 undergoes revolution about point O of intersection between a right angle line extending from the strut piston upper end 4 toward the automobile body and the axis of the lower arm 1. However, on the bump side the distance between the center O of revolution noted above and the tire center P in contact with the ground, i.e., 2 the "swing arm length", is increased with bumping. This means that the negative tire camber change is small. In addition, on the rebound side the positive camber change is increased. Further, the tread changes with respect to both the bump and rebound are large. Therefore, the time performance can not be sufficiently utilized, which is undesired for the improvement of the revolution performance. Besides, on unlevel road surfaces the vehicle body rocks to the left and right, thus resulting in unstable straight running.

The double wishbone type suspension is superior to the strut type one in that it permits optimmization of the suspension geometry and provides high freedom of design. However, if sufficient lengths of the upper and lower arms 6 and 7 can not be secured due to insufficient available space, it leads to insufficient vertical stroke of tire, sudden excessive camber and tread changes, unnatural movement in the transversal direction, reduced convergence period and consequent lack of steadiness of motion.

SUMMARY OF THE INVENTION

The invention has been intended in the light of the above circumstances, and its object is, to provide an automobile suspension which can obviate the drawbacks noted above in the prior art with a unique way of mounting various arms coupling the wheel carrier and the automobile body to each other, such as the upper and lower arms 6 and 7 in the strut and double wishbone type suspensions and further trailing arm in a semi-trailing type suspension, on the automobile body.

To attain the above object, according to the invention, there is provided an automobile suspension which comprises arms for coupling a wheel carrier to the automobile body, the arms including a wheel carrier side arm having an outer end coupled to the wheel carrier and an automobile body side arm having an outer end coupled to the automobile body, the automobile body side end of the wheel carrier side arm and the automobile side end of the automobile side arm being pin coupled, and moving means for moving the point of coupling of the arms up and down and also to the left and right (i.e., inward and outward of the automobile body) in an interlocked relation to and in the same direction as tire movement when the tire is moved up and down.

Also, according to the invention, there is provided an automobile suspension, which is of either strut or double wishbone type, and in which with respect to at least the bump in the up-and-down tire movement the moving means, in the case of the strut type, includes a pull rod coupling a position, at which an automobile body side lower arm or a point of coupling between the automobile body side lower arm and a wheel carrier side lower arm can be pulled up, such as a strut unit or an upper portion of the wheel carrier, and the neighborhood of the automobile body side lower arm or the coupling point and, in the case of the double wishbone type, includes a pull rod coupling the afore-said position, such as an upper portion of the wheel carrier or the wheel carrier side upper arm, and the automobile body side lower arm or the coupling point, the moving means further including, in the case of the double wishbone type, a coupling arm and a pull rod for the coupling between automobile body side upper and lower arms or the coupling between the automobile body side upper arm and the neighborhood of a lower coupling point between an automobile body side lower arm and a wheel carrier side lower arm.

Further, according to the invention, there is provided an automobile suspension, which is of either strut or double wishbone type, and in which with respect to at least the bump in the up-and-down tire movement the moving means, in the case of the strut type, includes a push rod coupling an automobile body side lower arm or a point of coupling between the automobile body side lower arm and a wheel carrier side lower arm, that is, coupling between a lower portion of the wheel carrier and the automobile body side lower arm or a coupling point between the automobile body side lower arm and a wheel carrier side lower arm and, in the case of the double wishbone type, includes a push rod coupling a position, at which an automobile body side upper arm or a ponit of coupling of the automobile body side upper arm and a wheel carrier side upper arm, that is, coupling a lower portion of the wheel carrier or the wheel carrier side lower arm and the automobile body side upper arm or a point of coupling between the automobile body side upper arm and the wheel carrier side upper arm, the moving means further including, in the case of the double wishbone type, a coupling arm coupling the automobile body side upper and lower arms or coupling an upper couping point between the automobile body side upper arm and the wheel carrier side upper arm and a lower coupling point between the automobile body side lower arm and the wheel carrier side lower arm.

Further, according to the invention, there is provided an automobile suspension, in which with respect to at least the bump in the up-and-down tire movement the moving means includes a push rod coupling a position, at which a lever having an end fulcrumed on the automobile body can be pulled up, and the lever, the moving means further including, in the case of the strut type, a pull rod coupling the lever and an automobile body side lower arm or a coupling point between the automobile body side lower arm and a wheel carrier side lower arm and, in the case of the double wishbone type, a pull rod coupling an upper or lower portion of such automobile body side arm and either an upper coupling point between an automobile body side upper arm and a wheel carrier side upper arm or a lower coupling point between the automobile body side lower arm and the wheel carrier side lower arm or a pull rod coupling the upper coupling point and the lower coupling point.

Further according to the invention, there is provided an automobile suspension, in which a wheel carrier side upper arm having an outer end coupled to the wheel carrier and the inner end of an automobile body side upper arm having an outer end coupled to the automobile body are pin coupled, and also in which the moving means includes a coupling arm coupling a lower arm having an outer end coupled to the wheel carrier and an inner end directly coupled to the automobile body and a lower portion of the wheel carrier or the lower arm or a point of coupling between the automobile body side upper arm and the wheel carrier side upper arm.

Further, according to the invention, there is provided an automobile suspension, in which a wheel carrier side lower arm having an outer end coupled to the wheel carrier and the inner end of each automobile body side lower arm having an outer end coupled to the automobile body are pin coupled, and also in which the moving means further includes a coupling arm coupling an upper arm having an outer end coupled to the wheel carrier and an inner end coupled to the automobile body and a point of coupling between an upper portion of the wheel carrier or the upper arm and the automobile body side lower arm or a point of coupling between the automobile body side lower arm and the wheel carrier side lower arm.

According to the invention, with adoption of the above problem solving means, the coupling point can be moved by the moving means vertically and transversally (i.e., inward and outward of the automobile body) in an interlocked relation to and in the direction of motion of the tire in vertical motion theeof. Thus, the coupling point noted above, i.e., the practical center of rotation of the inner arm end coupled to the wheel carrier can be moved to a position of optimum the geometry during running of the automobile, such as braking or whirling. This permits design freedom improvement over the prior art in setting the camber, tread and tow characteristics of the tire and setting the wheel stroke and other suspension geometry. Satisfactory straight running performance and high whirling performance of the automobile thus can be ensured to enhance the steering stability and reduce changes n the automobile attitude.

Further, according to the invention, in addition to the above function, the automobile side end of the arm coupled to the wheel carrier, i.e., the substantial center of rotation of the arm coupled to the wheel carrier, is moved to a set position by a simple mechanism comprising the pull or push rod or the push and pull rods coupled together by the lever. It is thus possible to realize the moving means noted above as a simple mechanism.

Further, according to the invention as claimed in claim 5, on the lower arm side of the double wishbone type suspension the wheel carrier upper portion is controlled with the long lower arm adopting the prior art technique, while on the upper arm side the wheel carrier portion is controlled by adopting and with a function of the invention, thus coping with the long lower arm noted above. It is thus possible to improve the camber and tread characteristics and the wheel stroke extent and provide compact upper arm accommodation space.

Further, according to the invention, on the lower arm side of the double wishbone type suspension with the high-mount upper arm the wheel carrier lower portion is controlled by adopting and with a function of the invention. It is thus possible inexpensively to improve the camber and tread characteristics, wheel stroke, etc. and provide compact lower arm accommodation space.

DETAILED DESCRIPTION OF THE PREFERRED EMBODIMENTS

Preferred embodiments of the invention will now be described.

Figure 3:
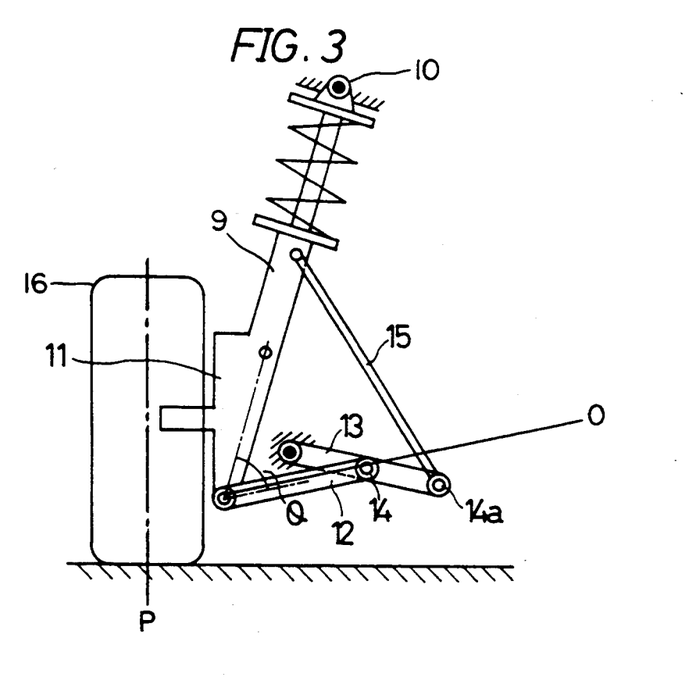
FIG. 3 is a structural representation, taken in the longitudinal direction of automobile, of an embodiment and modification of the invention applied to a strut type suspension.

FIG. 3 is a structural representation, taken in the longitudinal direction of thee automobile, of an embodiment of the invention applied to a suspension of the strut type. Referring to the Figure, designated as 9, is a strut unit including a shock absorber and a spring. The unit 9 has an internal piston rod with the upper end 10 thereof coupled to the automobile body (shown shaded) and a lower portion rigidly coupled to a wheel carrier 11.

Designated at 12 is a lower arm having an outer end, with respect to the automobile body, coupled to the wheel carrier, the other inner end and an axis inclined outwardly downward. Designated at 13 is an automobile body side arm (lower arm) with its outer end coupled to the automobile body (shown shaded), the other inner end pin coupled to the inner end of the lower arm 12 coupled to the wheel carrier. The automobile body side arm 13 has its axis shown to be inclined inwardly downward. Designated at 14 is a point of pin coupling of the inner ends of the arms 12 and 13. Designated at 15 is a pull rod having an upper end coupled to the strut unit 9, or to the wheel carrier 11, and a lower end coupled to the automobile body side lower arm 13, or to the coupling point 14a. The pull rod 15 operates in an interlocked relation to the vertical motion of the tire to raise the lower arm 13 or coupling point 14a at the time of bumping and lower these parts at the time of rebounding. Designated at 16 is the tire, at P the tire center in contact with the ground, and at O the center of the wheel carrier revolution.

In this embodiment, the position of the inner end of the lower,arm 12 coupled to the wheel carrier 11, i.e., the position of the center of rotation of the lower arm 12, is controlled by the pull rod 15, which has the upper end coupled to the strut unit 9 to the wheel carrier 11 and the automobile body side lower arm 13 or to the coupling point 14.

Figure 4:
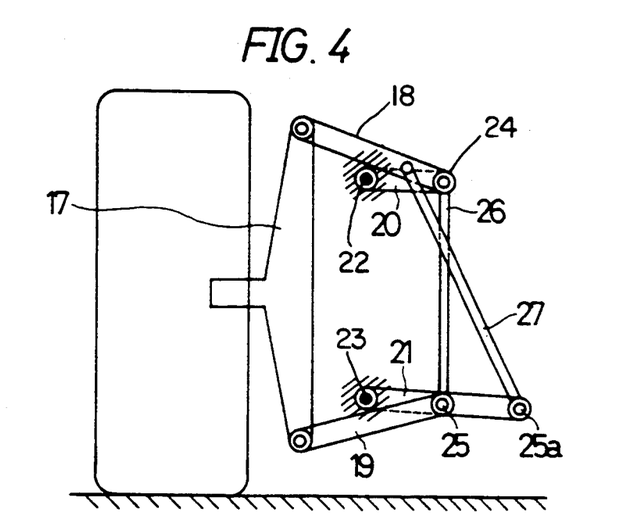
FIG. 4 is a structural representation, taken in the longitudinal direction of automobile, of an embodiment and modification thereof of the invention applied to a double wishbone type suspension.

FIG. 4 is a structural representation, taken in the longitudinal direction of the automobile body, of an embodiment of the invention applied to a suspension of the double wishbone type.

Referring to the Figure, designated at 17 is a wheel carrier, at 18 an upper arm coupled to the wheel carrier 17, at 19 a lower arm coupled to the wheel carrier 17, at 20 an upper arm coupled to the automobile body, at 21 a lower arm coupled to the automobile body, at 22 a point of coupling of the upper arm 20 to the automobile body, and at 23 a point of coupling of the lower arm 21 to the automobile body. Designated at 24 is a point of coupling between the upper arms 20 and 18 coupled to the automobile body and wheel carrier, respectively, and at 25 is a point of coupling between the lower arms 21 and 19 coupled to the automobile body and wheel carrier, respectively. Both these coupling points are pin coupling points. Designated at 26 is a coupling arm coupling the coupling points 24 and 25 to each other, and at 27 a pull rod having an upper end coupled to an upper portion of the wheel carrier 17 or to the upper arm 18 coupled to the wheel carrier and a lower end coupled to the other end of the lower arm 21 having one end coupled to the automobile body.

In this embodiment, like the embodiment shown in FIG. 3, the positions of the inner ends of the wheel carrier side upper and lower arms 18 and 19, i.e., the practical centers of rotation of the two arms 18 and 19, are controlled with the pull rod 27.

Figure 5:
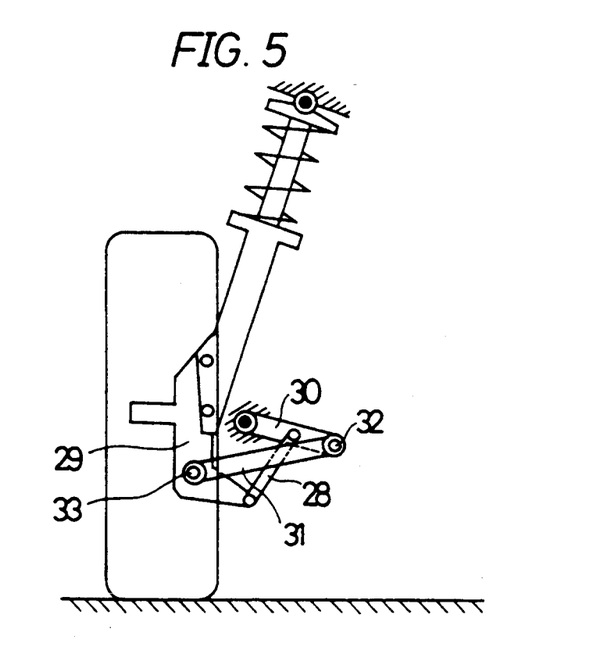
FIG. 5 is a structural representation, taken in the longitudinal direction of automobile, of an embodiment of the invention applied to a strut type suspension.
Figure 6:
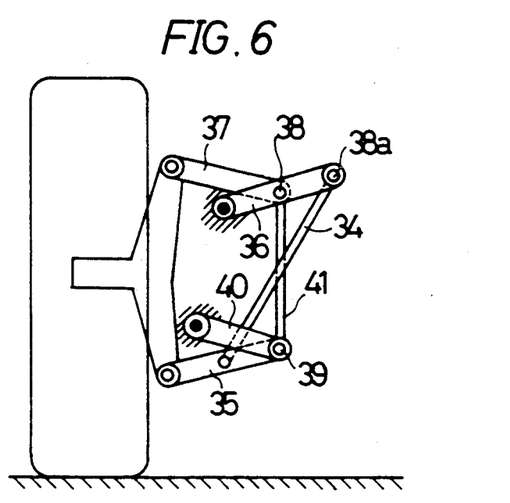
FIG. 6 is a structural representation, taken in the longitudinal direction of automobile, of an embodiment of the invention applied to a double wishbone type suspension.

FIGS. 5 and 6 show further embodiments of the invention applied to suspensions of the strut and double wishbone types.

In FIG. 5, designated at 28 is a push rod, at 29 a wheel carrier, at 30 an automobile body side lower arm having an outer end coupled to the automobile body and a lower end coupled to a wheel carrier side arm, at 31 the wheel carrier side arm having an outer end coupled to the wheel carrier 29 and an inner end coupled to the automobile body side lower arm 30, and at 32 a point of pin coupling between the automobile body side and wheel carrier side arms 30 and 31. Designated at 33 is a point of coupling between the wheel carrier side lower arm 31 and the wheel carrier 29.

In FIG. 6, designated at 34 is a push rod coupling a lower arm 35, which is coupled to the wheel carrier or to a wheel-carrier side lower arm 35, and an automobile body side upper arm 36, at 39 a point of coupling between an automobile body side lower arm 40 and the wheel carrier side lower arm 35, at 38 a point of coupling between the automobile body side upper arm 36 and a wheel carrier side upper arm 37, and at 41 an arm coupling the coupling points 38 and 39 to each other.

In the embodiment of FIG. 5, the position of the inner end of the wheel carrier side arm, i.e., the position of the center of rotation of the arm, is controlled by the push rod 28. In the embodiment of FIG. 6, it is controlled by the push rod 34.

Figure 7:
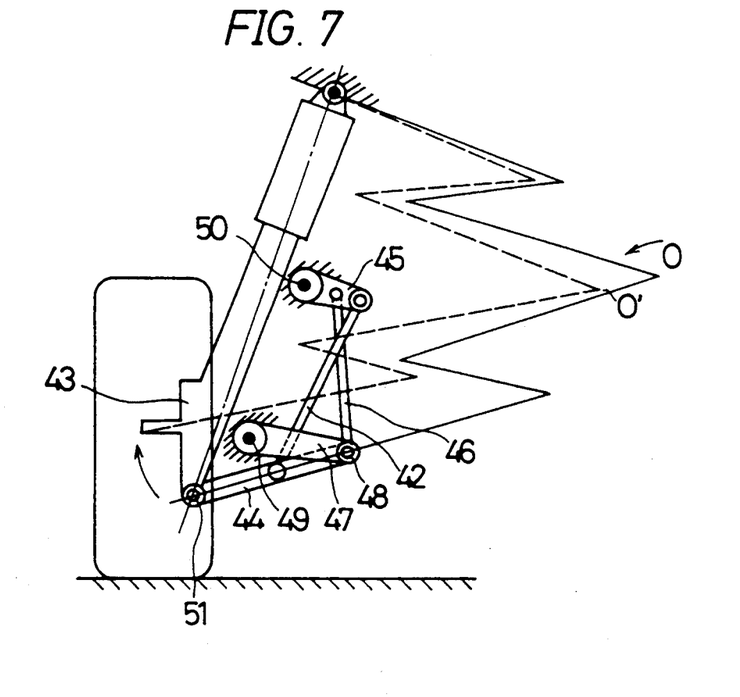
FIG. 7 is a structural representation, taken in the longitudinal direction of automobile, of an embodiment of the invention applied to a strut type suspension.
Figure 8:
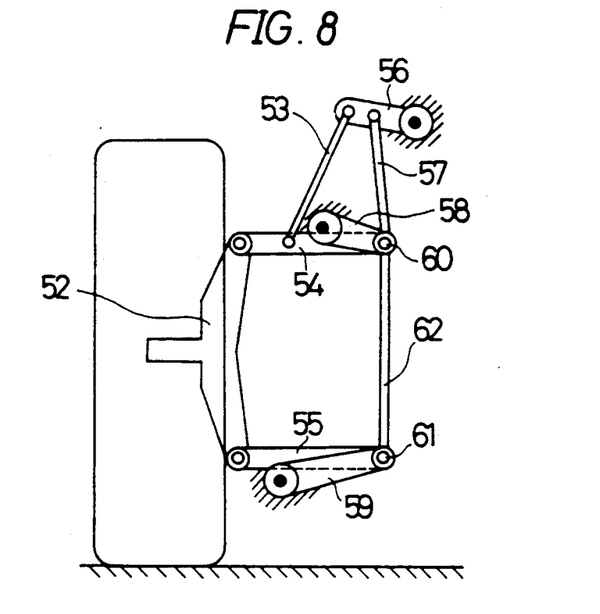
FIG. 8 is a structural representation, taken in the longitudinal direction of automobile, of an embodiment of the invention applied to a double wishbone type suspension.

FIGS. 7 and 8 show further embodiments of the invention applied to suspensions of the strut and double wishbone types. In these instances, the position of the inner end of a wheel carrier side arm, i.e., the position of the substantial center of rotation of the arm, is controlled by a push and a pull rod, the push rod having an upper end coupled to a lever fulcrumed on the automobile body and a lower end coupled to the wheel carrier or to a wheel carrier side lower or upper arm, the pull rod having an upper end coupled to the lever noted above and a lower end coupled to an automobile body side lower or upper arm or to a coupling point.

Referring to FIG. 7, designated at 42 is the push rod, which has its lower end coupled to a wheel carrier 43 or to a wheel carrier side lower art 44 and its upper end coupled to an automobile side lever 45. Designated at 46 is the pull rod, which couples an automobile side lower arm 47 or a coupling point 48 between the automobile side lower arm and the wheel carrier side lower arm 44 and the lever 45 to each other. Designated at 50 is an automobile body side coupling point at an end of the lever 45, and at 51 a coupling point between the wheel carrier side lower arm 44 and the wheel carrier 43. Designated at O is the center of rotation of the wheel carrier, and at O' a displaced center of rotation of the wheel carrier.

Referring to FIG. 8, designated at 52 is a wheel carrier, and at 53 a push rod, which has its lower end attached to a wheel carrier side upper or lower arm 54 or 55 or to the wheel carrier 52 and its upper end coupled to a lever 56 having an end coupled to the automobile body. Designated at 57 is a pull rod, which has its upper end coupled to the lever 56 and its lower end coupled to an automobile body side upper or lower arm 58 or 59, or to a coupling point 60 between a wheel carrier side and an automobile body side upper arm 54 and 58 or a coupling point 61 between a wheel carrier side and an automobile body side lower arm 55 and 59. The coupling points 60 and 61 are coupled to each Other by a coupling arm 62.

Figure 9:
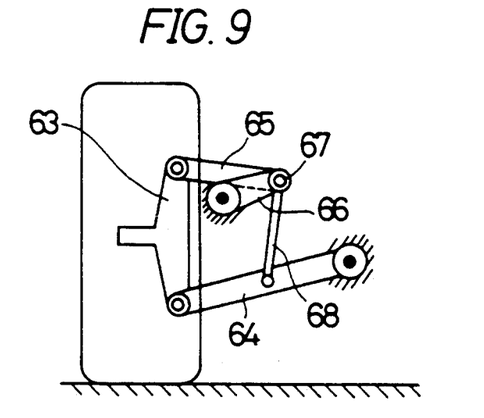
FIG. 9 is a structural representation, taken in the longitudinal direction of automobile, of an embodiment of the invention applied to a double wishbone type suspension.

FIG. 9 shows a further embodiment of the invention applied to the upper arm side of the double wishbone type suspension. Designated at 63 is a wheel carrier, at 64 a lower arm having an outer end coupled to the wheel carrier 63 and an inner end coupled to the automobile body (as shown shaded), at 65 a wheel carrier side upper arm, and at 66 an automobile body side upper arm. The inner ends of the arms 65 and 66 are pin coupled at a point 67 to each other. Designated at 68 is a push rod coupling the coupling point 67 and the wheel carrier 63 or the lower arm 64. The push rod 68 may have an outwardly or inwardly curved shape as well.

While the above embodiment of FIG. 9 is concerned with the upper arm side of the suspension, it is conceivable to apply the invention to the lower arm side of a double wishbone type suspension with a high-mount upper arm side.

Figure 10:
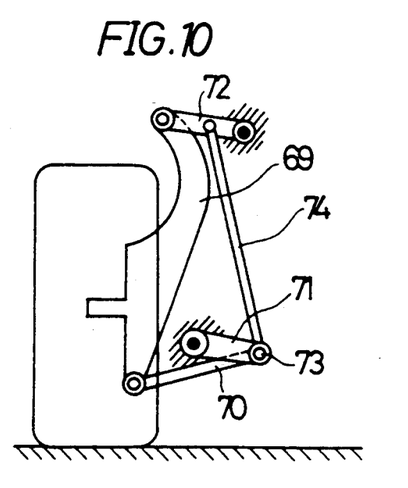
FIG. 10 is a view similar to FIG. 9 but showing a different embodiment.

FIG. 10 shows such an embodiment. In this instance, an upper arm 72, which has its outer end coupled to an upper portion of wheel carrier 69 extending above tire and its inner arm coupled to the automobile body, and a coupling point 73 between an automobile body side lower arm 71 and a wheel carrier side lower arm 70, are coupled to each other by a pull rod 74.

In the above strut type suspension embodiments, the lower arm plan view is of course conceivable variously, such as an L type, L arm plus trailing rod, inverse A arm, two parallel rings, etc. In such cases, it is conceivable to apply the invention to each automobile body side coupling. In this case, the trailing rod may be one according to the invention and may be one not according to the invention. In the latter case, it is possible to provide the tire with toe-in/toe-out by appropriately setting the position of the point of coupling of the trailing rod to the automobile body, the mounting angle of automobile body side arm coupled to lower arm inner end, etc.

Figure 11:
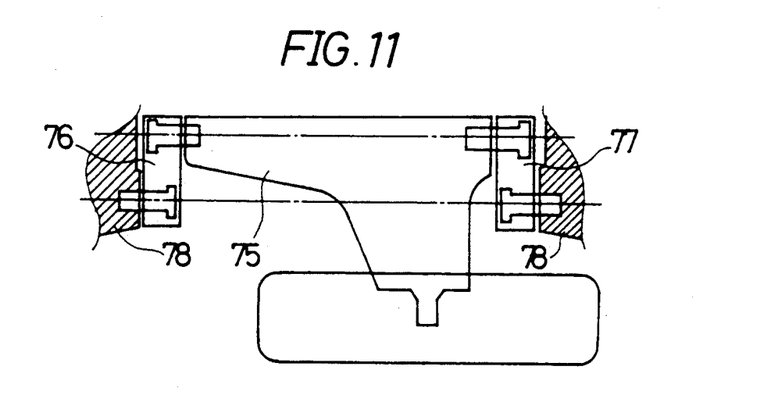
FIG. 11 is a schematic plan view showing an L-shaped lower arm.

FIG. 11 is a schematic plan view showing an instance of adopting an L type lower arm 75. The lower arm 75 has its inner front and rear ends coupled to automobile body side arms 76 and 77 coupled to automobile body 78 (as shown shaded), and its outer front end is coupled directly to the automobile body (not shown). To provide toe-in/to-out when the tire bumps and rebounds, the axis of the automobile side arm coupled to the inner rear end of the lower arm is inclined outwardly downward. With this arrangement, when the tire bumps, the coupling point between the automobile body side arm and lower arm is displaced transversally outward to provide toe-in. When the tire rebounds, on the other hand, the coupling point is displaced transversally inward to provide toe-out.

Figure 12:
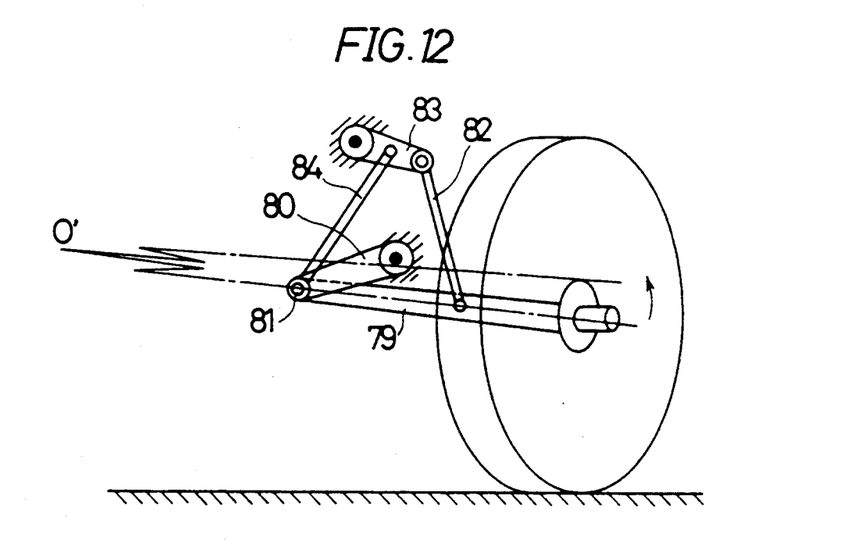
FIG. 12 is a structural representation, taken from the front side of automobile, of a semi-trailing type suspension.
Figure 13:
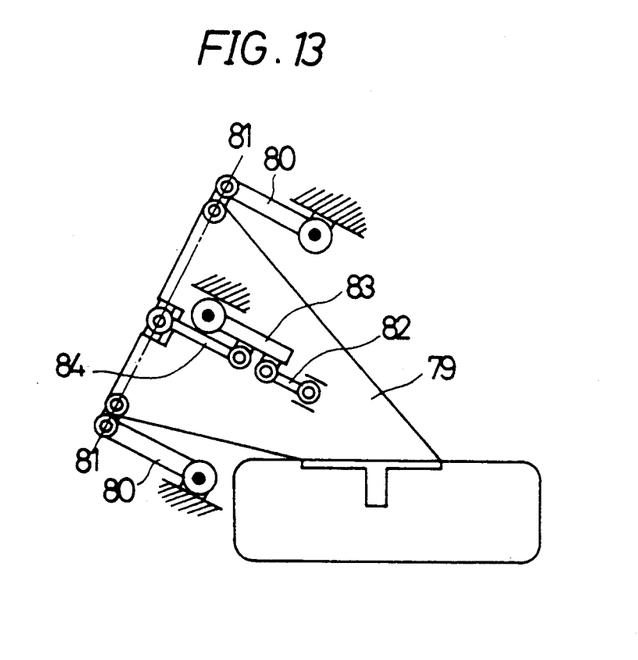
FIG. 13 is a structural representation, taken as a plan view, of the suspension shown in FIG. 12.

FIGS. 12 and 13 show instances of application of the invention to semi-trailing type suspensions. Designated at 79 is a trailing arm with a center O' of momentary rotation, a 80 an automobile body side arm, at 82 a push rod coupling a lever fulcrumed on the automobile body and the training arm 79, and at 84 is a pull rod coupling the lever 83 and coupling point 81. At the time of the bumping, the coupling point 81 is displaced upward. At the time of the rebounding, it is displaced downward. Thus, it is possible to bring the center of momentary rotation of the trailing arm 79 to a position further ahead of the coupling point 81.

Figure 14:
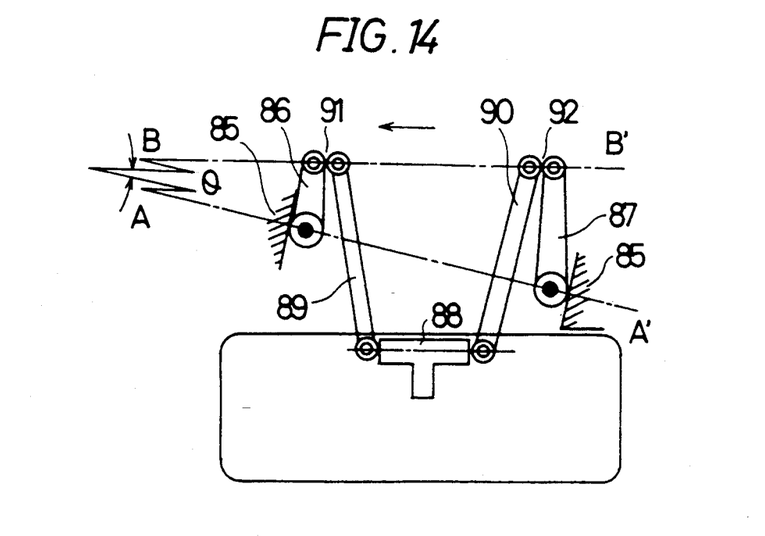
FIG. 14 is a schematic representation, taken in the vertical direction of automobile, of the suspension shown in FIG. 13.

FIG. 14 is a view taken in vertical direction of automobile, showing an example of relation between the the axis of rotation of the automobile body side coupling point of the automobile body side arm and the axis of rotation of the coupling point between the wheel carrier side and automobile body side arms. As shown, an angle $\theta$ is provided between the axis A—A' of rotation of points 85 of coupling of automobile body side arms 86 and 87 to automobile body and the axis B—B' of rotation of points of coupling of wheel carrier side arms 89 and 90, on one hand, which have their outer end coupled to wheel carrier 88, and the automobile body side arms 86 and 87, on the other hand. This arrangement permits a change to toe-in/toe-in at the time of the bumping/rebounding. To provide the angle $\theta$, the length of the automobile body side arm 86 nearer the front of the automobile body (as shown 1 by arrow in FIG. 14) is set to be less than the length of the automobile body side arm 87 nearer the rear of the automobile body. With this arrangements, the transversal displacement of the coupling point 91 between the automobile body side arm 86 nearer the front and the wheel carrier side arm 89 is less than that of the coupling point 92 between the automobile body side arm 87 nearer the rear and the wheel carrier side arm 90. Thus, the change to toe-in/toe-in can be obtained at the time of the bumping/rebounding.

Where the lengths of the automobile body side arms 86 and 87 are set to be equal while providing an inwardly downward inclination of the axis of the automobile body side arm 87 nearer the rear, for obtaining a change toe-in/toe-out at the time of bumping/rebounding, the axis of the automobile body side arm 87 nearer the rear is inclined outwardly downward. In this arrangement, the transversal displacement of the automobile body side arm 87 nearer the rear is greater than that of the arm 86 nearer the front. Thus, it is possible to obtain a change to toe-in/toe-out at the time of the bumping/rebounding, (however, the the axes of the two automobile body side arms are set to be at an equal angle to the horizontal).

In each of the above embodiments, the distances between mounting positions, mounting angles, etc. of mounting portions of individual parts are of course adequately designed in accordance with the status of the automobile and various conditions of application.

Now, functions of the embodiments will be described.

In the embodiment of FIG. 3, when the tire bumps in response to an input from the road surface, the strut unit 9 absorbs and alleviates the input energy while shrinking with respect to the coupling point of the strut unit piston rod 10 to the automobile body.

At the same time, the arm outer end is coupled to the wheel carrier 11. Further, the wheel carrier side arm 12, which has its axis inclined outwardly downward, is rotated upwardly outward about the coupling point 14 to the inner end of the automobile body side arm 13 (although the upper side with respect to the status parallel to the road surface is changed upwardly inward). However, since the inner end of the automobile body side arm, i.e. the coupling point 14 to the wheel carrier side arm, is coupled via the pull rod 15 to the strut unit, with an upward movement of the strut unit the automobile body side arm, which has its axis inclined inwardly downward about the automobile body side coupling point, is pulled upwardly inward. Thus, the position of the inner end of the wheel carrier side arm, i.e., the fulcrumed point of the wheel carrier side arm, is moved in the same direction as the tire bump. Particularly, on the important bump side the camber characteristic is changed to the negative side. Further, regarding the tread Change, with a change to the outer side (i.e., to the plus side) caused by upward rotation of the wheel carrier side arm the automobile body side arm is changed upward and to the inner side (i.e., to the minus side). Thus, the tread change can be held small.

When the tire rebounds, the wheel carrier side arm 12 is downwardly inward about the coupling point 14 to the inner end of the automobile body side arm 13, thus tending to change the tire camber to the positive side and change the tread to the inner side (i.e., to the minus side). However, simultaneously with the rebounding of the tire, the pull rod 15 coupled to the strut unit 9 is moved downward. Thus, the arm outer end is coupled to the automobile body, and thus the automobile body side arm 13 with the axis thereof inclined inwardly downward is rotated downwardly outward about about its coupling point to the automobile body (i.e., to change the camber to the negative side and change the tread to the plus side).

As a result, the inner end position of the wheel carrier side arm 12, i.e., the fulcrumed point of this arm, is moved outward on the same downward side as the rebound side of the tire. This means that, unlike the prior art strut type suspension, there is no possibility of a great change of the camber characteristic to the positive side on the rebound side or a great change of the tread characteristic to the minus side on the bump side. Thus, on the rebound side, the camber characteristic can be changed to the negative side while holding the tread characteristic change to be small, and on the bump side the camber characteristic can be changed to the negative side.

Further, in the instance of FIG. 3, the axes of the wheel carrier side and automobile body side arms are inclined outwardly and inwardly downward, respectively, this arrangement is by no means limitative. That is, it is possible to use various combinations of the arrangements of the wheel carrier side and automobile body side arm axes, such as in outwardly downward inclination, horizontal, inwardly downward inclination, etc. for appropriate setting of the distances between mounting positions, mounting angles, etc. of the wheel carrier side and automobile body side arms, pull rod, etc. to secure optimum camber and tread characteristics of tire matching varying running state of the automobile.

For instance, as for the camber characteristic, great camber change can be obtained by setting the lengths, mounting positions, mounting angles, etc. of the arms and pull rod such that the center O of rotation of the wheel carrier is moved to the wheel carrier side (i.e., to left lower side in FIG. 3), that is, the distance between the center P of tire in contact with ground and the center O of rotation of the wheel carrier, i.e., the "swing arm length", is reduced as bumping proceeds. This means that with wide tires which are finding increasing applications in recent years, the wide tread surface can be urged uniformly against the road surface at all times.

In the embodiments of FIG. 4 and following Figures, the functions are basically the same as those described above. In the embodiment of FIG. 4, like the embodiment of FIG. 3, the inner ends of the double wishbone type suspension wheel carrier upper and lower arms 18 and 19, i.e., the positions of the centers of rotation of the two wheel carrier side arms, are controlled by the pull rod 27. The up-and-down motion of the tire is transmitted from the wheel carrier side upper arm 18, which is coupled to the wheel carrier 17, via the pull rod 27 to the lower coupling point 25a and thence via the upper coupling point 24 to the positions of the inner end of the wheel carrier side lower and upper arms 19 and 18, i.e., the centers of rotation of these arms, thus moving these positions in the same direction as the tire movement.

In this embodiment, it is again possible to obtain optimum suspension geometry of tire matching varying running status of the automobile.

In modifications of the embodiment of FIG. 4, it is possible to further improve the above various effects as noted earlier.

In the embodiments of FIGS. 5 and 6, the positions of the fulcrumed inner ends of the strut or double wishbone type suspension wheel carrier side arms are controlled by a push rod instead of a pull rod which is used in the above embodiments. In the strut type, the automobile body side arm 30 or the coupling point 32 is pulled upland down in the same direction as the tire movement by the push rod 28 interlocked to the up-and-down movement of the tire. In the double wishbone type, the automobile side upper arm 36 or the coupling point 38 is moved likewise with the push rod 34. In this way, the fulcrumed position 32 of the wheel carrier side lower arm 31 or the fulcrumed positions 39 and 38 of the wheel carrier side lower and upper arms 35 and 37 can be controlled.

In the embodiments of FIGS. 7 and 8, the up-and-down movement of the tire is transmitted to the push rod 42 or 53 with the lower end thereof coupled to the wheel carrier 43 or 52 and then via the upper end of the push rod to the lever 45 or 56 fulcrumed on the automobile body and thence via the pull rod 46 or 57, which has its upper end coupled to the lever and to the automobile body side arm 47 or 58 or 59, to which the lower end of the pull rod is coupled, or to the coupling point 48 or 60 or 61 to pull up or down thee arm or the coupling point in the same direction as the tire movement. In this way, the inner end of the wheel carrier side arm 44 or 54 or 55 is position controlled.

In the embodiment of FIG. 9, in response to up-and-down tire movement the coupling point 67 is moved in the same direction as the rife movement by the push rod 68 coupling the intermediate position of the lower arm 64 and the coupling point 67. In this way, the inner end of the wheel carrier side arm 65 is position controlled.

In the embodiments of FIG. 10, in response to up-and-down tire movements the coupling point 73 is moved in the same direction as the time movement by the pull rod 74 coupling the intermediate position of the upper arm 72 and the coupling point 73 for position control of the inner end of the wheel carrier side arm 70.

In the embodiments of FIGS. 12 and 13, the up-and-down movement of tire is transmitted from the upper end of the push rod 82, which is coupled to the lower end of the swing arm 79 interlocked to the up-and-down tire movement, to the lever 83 with an end thereof coupled to the automobile body, and thence via the pull rod 84, which has its upper end coupled to the lever and its lower end coupled to the coupling point 81 to cause movement thereof in the same direction as the tire movement. In this way, the center O' of rotation of the swing arm 79 can be moved further forward than the coupling point 81 of the automobile side arm 80. These embodiments are applicable to a two-wheeled automobile suspension, particularly to the rear wheel thereof. In this case, by arranging the coupling point center line 81—81 perpendicular to the automobile center line and parallel to the rear wheel axis, it is possible to provide a rear suspension having a great wheel stroke.

With the structures as described above according to the invention, the following effects can be obtained.

According to the invention, the position of the coupling point between the inner end of the wheel carrier side arm coupled to the wheel carrier and the automobile body side arm, i.e., the position of the center of the wheel carrier side arm, can be moved up and down and also to the left and right in an interlocked relation to the up-and-down movement of the tire and in the same direction of tire movement. It is thus possible to set the camber, i.e., the inclination of the wheel carrier carrying the wheel mounted thereon with respect to the road surface, the tread, i.e., the distance between tire centers in contact with the ground, the wheel stroke, etc., to obtain the optimum suspension geometry for the automobile. Thus, the steering stability and comfortability can be improved with improved whirling and straight running performance. In addition, even when the invention is applied to the low profile tire which has recently gaining popularity, it is possible to hold the tire vertical to the road surface at all times. This means that the wear of the tire can be uniformalized to extend the tire life. Further, the length of various arms in the suspension can be reduced compared to that in the prior art to increase the mechanical strength of the arms and reduce the weight thereof, as well as increasing the space of the engine room, the trunk, and passenger room.

Further, according to the invention, in addition to the above effects, a pull rod, a push rod or a structure of a push and a pull rod coupled together by a lever having an end coupled to the automobile body may be used as the means for moving the coupling point between the automobile body side and wheel carrier side arms or the automobile body side arm up and down and also to the left and right in an interlocked relation to the tire and in the same direction as the up-and-down movement of the tire. Thus, moving means, which are simple in construction and comprise a reduced number of components, can be realized. When the invention is applied to the strut type suspension, it is thus possible, in addition to be able to make use of the prior art, to permit movement of the center of revolution of the wheel carrier to the side thereof as in the double wishbone type suspension without greatly changing the individual mounting parts or increasing the number of components. This permits improvement of the camber and tread characteristics.

Further, by adopting the double wishbone type suspension, further improvement of the camber and tread characteristics can be obtained which improves whirling performance compared to the prior art and also reduces the tread change, thus improving the straight running stability and hence the steering stability and ensures safe and comfortable running. Further, since the arm length can be reduced, weight reduction can be obtained. Further, by adopting the semi-trailing or trailing suspension the center of rotation of the trailing arm can be moved to a position ahead of the coupling point between the trailing arm and the automobile body side arm. Thus, the swing of the trailing arm with a greater rotation radius than the actual length of the trailing arm can be obtained. When this structure is adopted for a rear suspension, it is thus possible to improve the ride comfortability without reducing rear seat space or the like.

Further, according to the invention, it is possible to provide a suspension which permits the above effects to be obtained without a cost increase, by adopting the prior art structure for the lower arm.

Further, according to the invention, it is possible to provide a suspension which can make use of the merits of the high-mount type upper arm inexpensively by adopting the prior art structure for the upper arm.

What is claimed is:

1. An automobile suspension coupling a wheel carrier to an automobile body, the suspension comprising:
   a strut unit coupled to the wheel carrier and the automobile body;
   a wheel carrier side lower arm having an outer end coupled to the wheel carrier;
   an automobile body side lower arm having an outer end coupled to the automobile body and an automobile body side end pin coupled to an automobile side end of said wheel carrier side lower arm; and
   moving means for moving the point of coupling of the wheel carrier side lower arm and the automobile body side lower arm up, down, left, and right, where left corresponds to inward and right corresponds to outward of the automobile body, in an interlocked relation to and in the same direction as tire movement when a tire coupled to the wheel carrier is moved up and down, comprising a pull rod coupled at a first position at which one of the automobile body side lower arm and the point of coupling between the automobile body side lower arm and a wheel carrier side lower arm can be pulled up including a first position at one of the strut unit and an upper position of the wheel carrier and the pull rod coupled at a second position on of one of the automobile body side lower arm and the point of coupling between the automobile body side lower arm and the wheel carrier side lower arm.

2. An automobile suspension coupling a wheel carrier to an automobile body, the suspension comprising:
   a strut unit coupled to the wheel carrier and the automobile body;
   a wheel carrier side lower arm having an outer end coupled to the wheel carrier;.
   an automobile body side lower arm having an outer end coupled to the automobile body and an automobile body side end pin coupled to an automobile side end of said wheel carrier side lower arm; and
   moving means comprising a push rod which couples at a first position one of the automobile body side lower arm and on the point of coupling between the automobile body side lower arm and the wheel carrier side lower arm to a second position at a lower portion of the wheel carrier.

3. The automobile suspension according to claim 2, the suspension further comprising a lever fulcrumed on the automobile body and wherein the moving means comprises:
   a push rod coupling one of the wheel carrier and the wheel carrier side lower arm to the lever so that lever can be pushed up; and
   a pull rod coupling said lever to one of the automobile body side lower arm and the point of coupling between the automobile body side lower arm and the wheel carrier side lower arm.

4. An automobile suspension coupling a wheel carrier to an automobile body, the suspension comprising:
   a wheel carrier side lower arm having an outer end coupled to the wheel carrier;

an automobile body side lower arm having an outer end coupled to the automobile body and an automobile body side end pin coupled to an automobile side end of said wheel carrier side lower arm;

an upper arm having an outer end coupled to the wheel carrier and an inner end coupled to the automobile body; and moving means comprising a pull rod coupling one of the upper arm and a point of coupling between an upper portion of the wheel carrier and said upper arm to one of the automobile body side lower arm and the point of coupling between the automobile body side lower arm and the wheel carrier side lower arm.

5. The automobile suspension coupling a wheel carrier to an automobile body, the suspension comprising:

a wheel carrier side lower arm having an outer end coupled to the wheel carrier;

an automobile body side lower arm having an outer end coupled to the automobile body and an automobile body side end pin coupled to an automobile side end of said wheel carrier side lower arm;

an automobile body side upper arm having an outer end coupled to the automobile body;

a wheel carrier side upper arm having an outer end coupled to an upper portion of the wheel carrier; and moving means for moving the point of coupling of said wheel carrier side lower arm and automobile body side lower arm up, down, left, and right, where left corresponds to inward and right corresponds to outward of the automobile body, in an interlocked relation to and in the same direction as tire movement when a tire coupled to the wheel carrier is moved up and down, comprising:

a pull rod coupled at a first position at which one of the automobile body side lower arm and the point of coupling between the automobile body side lower arm and the wheel carrier side lower arm can be pulled up including a first position at one of the upper portion of the wheel carrier and the wheel carrier side upper arm and the pull rod coupled at a second position on one of the automobile body side lower arm and the point of coupling between the automobile body side lower arm and the wheel carrier side lower arm, and a coupling arm for coupling between a first position of the automobile body side upper arm and a second position of one of the automobile body side lower arm and on the point of coupling between the automobile body side lower arm and the wheel carrier side lower arm.

6. The automobile suspension according to claim 5, the automobile body side upper arm having an automobile body side end pin coupled to an automobile side end of said wheel carrier side upper arm and the moving means comprising:

a push rod which couples a first position at one of the automobile body side upper arm and the point of coupling between the automobile body upper arm and the wheel carrier side upper arm to a second position at one of a lower portion of the wheel carrier and the wheel carrier side lower arm; and a coupling arm coupling one of the automobile body side upper arm to the automobile body side lower arm and the point of coupling point between the automobile body side upper arm and the wheel carrier side upper arm and the point of coupling between the automobile body side lower arm and the wheel carrier side lower arm.

7. The automobile suspension according to claim 5, the suspension further comprising a lever fulcrumed on the automobile body, the automobile body side upper arm having an automobile body side end pin coupled to an automobile side end of said wheel carrier side upper arm, and the moving means comprising:

a push rod coupling one of the wheel carrier, the wheel carrier side lower arm, and the wheel carrier side upper arm to the lever so that lever can be pushed up; and a pull rod coupling one end to the lever and its other end to one of the automobile body side upper arm, the automobile body side lower arm, the point of coupling point between the automobile body side upper arm and the wheel carrier side upper arm, and the lower coupling point between the automobile body side lower arm and the-wheel carrier side lower arm.

8. The automobile suspension according to claim 5, the suspension further comprising a lever fulcrumed on the automobile body, the automobile body side upper arm having an automobile body side end pin coupled to an automobile side end of said wheel carrier side upper arm, and the moving means comprising:

a push rod coupling one of the wheel carrier, the wheel carrier side lower arm, and the wheel carrier side upper arm to the lever so that lever can be pushed up;

a first pull rod coupling the lever to one of the automobile body side upper arm and the point of coupling between the automobile body side upper arm and the wheel carrier side upper arm; and a second pull rod coupling the point of coupling between the automobile body side upper arm and the wheel carrier side upper arm to the lower point of coupling between the automobile body side lower arm and the wheel carrier side lower arm.

* * * * *